June 13, 1967  D. S. LOVE  3,325,577
MANUFACTURE OF SEALING CAPS
Filed Aug. 19, 1965
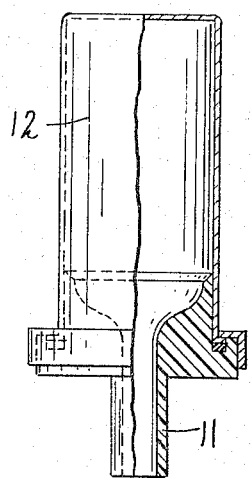
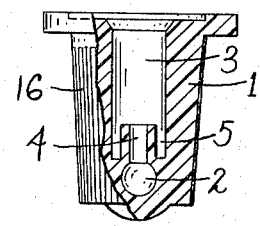
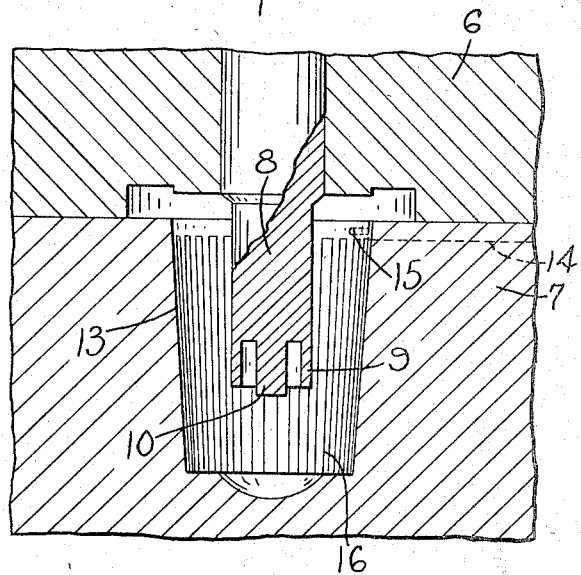
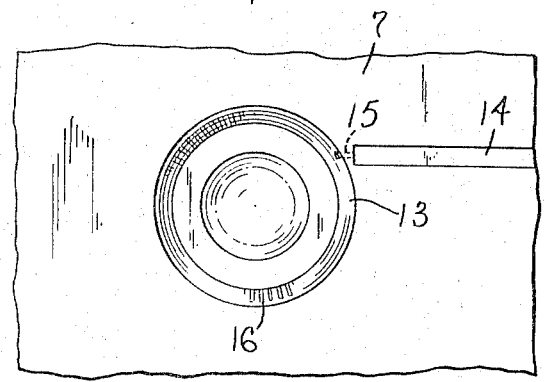
INVENTOR
Douglas S. Love

United States Patent Office 3,325,577
Patented June 13, 1967

3,325,577
MANUFACTURE OF SEALING CAPS
Douglas Stanley Love, Thornton Heath, England, assignor to Express Injector Company Limited, Brighton, England, a British company
Filed Aug. 19, 1965, Ser. No. 481,910
Claims priority, application Great Britain, Aug. 19, 1964, 33,866/64
1 Claim. (Cl. 264—328)

The present invention relates to the manufacture of sealing caps suitable for ampoules used in needleless hypodermic injectors.

The specification of patent application 344,150 of February 11, 1964, described ampoules which have a large orifice extending as a tubular projection. Among various caps which may be capable of sealing such an orifice, it has been preferred to use a modified type of sealing cap, which has an inner compartment connected to the outside through a projecting passage-way as described in the specification of patent application 344,150 with reference to FIG. 10. On assembly onto the ampoule, this passage-way projects into the tubular orifice of the ampoule. The purpose of the inner compartment is to take up any air accidentally entrapped in the ampoule during filling and to retain it so that the air cannot return into the container part of the ampoule.

According to the present invention there is provided a method for the manufacture of sealing caps having an inner compartment connected to the hollow centre of the cap by a passage narrower than the compartment itself, which method comprises feeding fluid plastic into a corresponding mould impression which has no air-vent so as to induce a turbulent flow removing the air from the perimeter area of the impression, and solidifying the plastic with the entrapped air positioned adjacent to a centre core-pin that shapes the passage and the hollow centre part of the cap. In a particular aspect the turbulent flow is provided by feeding the fluid plastic in a direction not intersecting the axis of the centre core-pin, i.e. in a direction forming an acute angle with the tangent at the point of entry to the impression. It is preferred to feed the fluid plastic at a point farthest from the intended position of the inner compartment, and a turbulent flow may conveniently be achieved by feeding the fluid off-centre, that is in a direction not aimed at the axis of the centre pin. The turbulency in the perimeter area may further be enhanced by having longitudinal grooves on the impression producing a cap with corresponding grooves on its outside.

In order that the invention may be more readily understood, reference will be made to FIGS. 1 to 4 of the accompanying drawings.

In the drawings:

FIG. 1 is a partial elevation and axial section of an ampoule without a sealing cap.

FIG. 2 is a partial elevation and axial section of a sealing cap.

FIG. 3 is an axial section of an assembled mould with a cap-shaped impression,

FIG. 4 is a top view of the lower part of the mould.

To form a cap 1, which has an inner compartment 2 communicating with a hollow cylindrical centre 3 through a passage 4, an appropriate cooled mould comprising an upper part 6 and a lower part 7 is assembled. The upper part 6 carries a core-pin 8 with a concentrically positioned annular projection 9 and a stem 10 at its lower end. The upper part of the core-pin 8 corresponds to the hollow cylindrical centre 3, and the annular projection 9 to an annular recess 5 in the cap 1. The recess 5 is adapted to receive and engage a corresponding tubular projection 11 of an ampoule 12.

Each mould may contain a plurality of impressions 13 providing the outer shape of the cap 1, and a feed runner 14 is connecting each impression with the source of fluid plastic. The feed runner 14 ends in a small straight feed gate 15 to provide an accurate angle of entry. The internal surface of the impression 13 is provided with grooves 16.

In the manufacturing process the fluid plastic is fed through the runner 14 and feed gate 15 into the impression 13. Under the normal pressure and temperature conditions of plastic moulding in cooled moulds, the entrapped air corresponding to the volume of the impression and the feed runners is sufficient to form an air bubble adjacent to the stem 10 providing thereby the required inner compartment 2 when the plastic solidifies.

In the case of a cap having a length of ⅜ in. (10 mm.), an internal diameter of ⅛ in. (3 mm.), and a passage of 0.01 in. (0.3 mm.) wide, the size of the internal compartment may be around 0.04 in. (1 mm.). Feed runners of approximately ⅛ in. (3 mm.) diameter and a small, straight feed gate of about 0.04 in. (1 mm.) wide have been found convenient to produce such a cap. Advantageously, the direction of the feed gate may be tangential to a circle halfway between the perimeter of the mould impression and the axis of the core-pin.

Any mouldable plastic which provides similar flow characteristics may be used, but polyethylene has been preferred. It is well within the knowledge of those skilled in the art to find out the various conditions required for moulding a particular plastic, and the variants of those conditions may provide smaller or larger inner compartments. Methods which employ such alternative conditions providing inner compartments according to various requirements are therefore within the scope of the invention.

What I claim is:

A method of manufacturing sealings caps for vessels having a generally cylindrical wall defining a neck portion in which the sealing cap has an elongated passage adapted to receive said neck and a hollow portion of greater cross-sectional area communicating with said passage, comprising the steps of providing a first lower mold section defining a cavity, providing a second mating mold section having a depending core pin with an essentially cylndrical exterior surface arranged to extend essentially coaxially in said cavity and having an annular recess in the lower end surface thereof surrounding a cylindrical projection which extends beyond said end surface, joining said mold sections so as to allow no venting thereof, and feeding material in a fluid state into the cavity defined by said mold sections at the upper edge of said lower mold section in a path which is generally tangential in its entirety to the exterior surface of said core pin so as to produce turbulent flow of the material around said pin and the wall of said cavity in said cavity which forces air in said cavity downwardly and entraps the air in said cavity at the end of said projection to define said hollow portion.

References Cited
UNITED STATES PATENTS

| | | | |
|---|---|---|---|
| 2,330,369 | 9/1943 | Marsh | 18—305 |
| 2,378,586 | 6/1945 | Schultz. | |
| 2,425,611 | 8/1947 | Frost | 264—318 |
| 3,013,308 | 12/1961 | Armour | 264—318 |

ROBERT F. WHITE, Primary Examiner.
ALEXANDER H. BRODMERKEL, Examiner.
R. B. MOFFITT, Assistant Examiner.